United States Patent
Mori et al.

[11] Patent Number: 5,262,369
[45] Date of Patent: Nov. 16, 1993

[54] DIELECTRIC CERAMIC COMPOSITIONS

[75] Inventors: Toru Mori; Atsushi Ochi; Kazuaki Utsumi, all of Tokyo; Tetsuo Yoshimoto, Kanagawa; Souichiro Sugano, Tokyo; Shinji Abe, Kanagawa, all of Japan

[73] Assignee: NEC Corporation, Tokyo, Japan

[21] Appl. No.: 807,879

[22] PCT Filed: Jul. 13, 1990

[86] PCT No.: PCT/JP90/00911
 § 371 Date: Jan. 21, 1992
 § 102(e) Date: Jan. 21, 1992

[87] PCT Pub. No.: WO91/01283
 PCT Pub. Date: Feb. 7, 1991

[30] Foreign Application Priority Data

Jul. 20, 1989 [JP] Japan ................. 1-185942

[51] Int. Cl.$^5$ .............................. C04B 35/46
[52] U.S. Cl. .................................. 501/136
[58] Field of Search ......................... 501/136

[56] References Cited
U.S. PATENT DOCUMENTS 4,791,078 12/1988 Saito et al. ............... 501/136

FOREIGN PATENT DOCUMENTS 56-12962  4/1981  Japan.
61-28619  7/1986  Japan.
63-55155  3/1988  Japan.
63-55157  3/1988  Japan.
63-112451 5/1988  Japan.
63-112452 5/1988  Japan.

Primary Examiner—Mark L. Bell
Assistant Examiner—Deborah Jones
Attorney, Agent, or Firm—Banner, Birch, McKie and Beckett

[57] ABSTRACT

The improved dielectric ceramic composition has sufficiently high dielectric constant, high insulation resistance and small dielectric loss to be suitable for use as a material for ceramic capacitors. The composition comprises as a main component a three-component ceramic composition in solid solution having the formula $Pb(Mg_{\frac{1}{3}}Nb_{\frac{2}{3}})O_3$-$Pb(Ni_{\frac{1}{3}}Nb_{\frac{2}{3}})O_3$-$PbTiO_3$ which, when expressed by $xPb(Mg_{\frac{1}{3}}Nb_{\frac{2}{3}})O_3$-$yPb(Ni_{\frac{1}{3}}Nb_{\frac{2}{3}})O_3$-$zPbTiO_3$, is defined by the area surrounded by the following points of (x, y, z), i.e., (0.70, 0.20, 0.10), (0.70, 0.15, 0.15), (0.83, 0.02, 0.15), (0.96, 0.02, 0.02) and (0.78, 0.20, 0.02), and this ceramic composition further contains a Mn oxide or a Mn-containing complex oxide as an additive.

10 Claims, No Drawings

DIELECTRIC CERAMIC COMPOSITIONS

TECHNICAL FIELD

Included among ceramic compositions for use in the production of dielectric ceramics are $Pb(Mg_{\frac{1}{3}}Nb_{\frac{2}{3}})O_3$ containing ceramics, which have extremely high specific inductive capacity and find increasing use today in high-permittivity ceramic capacitors. The present invention relates to dielectric ceramic compositions that have sufficiently high dielectric constant, high insulation resistance and low dielectric loss to be suitable for use as materials for high-permittivity ceramic capacitors, namely, it relates to three-component ceramic compositions in solid solution represented by the general formula $Pb(Mg_{\frac{1}{3}}Nb_{\frac{2}{3}})O_3$-$Pb(Ni_{\frac{1}{3}}Nb_{\frac{2}{3}})O_3$-$PbTiO_3$.

BACKGROUND ART

With the recent tendency towards miniaturization of electronic equipment, a strong demand has arisen for miniaturizing electronic parts and there is also an increasing demand for reducing the size of multilayer ceramic capacitors. To meet these needs, dielectric ceramics are required to satisfy the following conditions for electrical characteristics, i.e., high dielectric constant, small dielectric loss and high insulation resistance. In order to miniaturize devices, the thickness of individual layers of a multilayer ceramic capacitor must be reduced but with conventional ceramic compositions for ceramic capacitors, there has been a limit on the efforts to reduce the thickness of each layer since the grains of a sintered body are large enough to form residual pores. A further problem in the efforts toward size reduction and larger capacity is that the inevitable increase in electrode areas leads to a higher cost if conventional Pd-based materials for internal electrodes are used. Several patents have issued on three-component ceramic compositions that contain $Pb(Mg_{\frac{1}{3}}Nb_{\frac{2}{3}})O_3$ (hereinafter abbreviated as PMN), $Pb(Ni_{\frac{1}{3}}Nb_{\frac{2}{3}})O_3$ (hereinafter abbreviated as PNN) and $PbTiO_3$ (hereinafter abbreviated as PT) but each of the proposals has necessitated a high sintering temperature. For example, Japanese Patent Publication No. 13962/1981 proposed a PMN-PNN-PT based solid solution that attained a relative dielectric permittivity of 23000–24000 but the sintering temperature was as high as 1230°–1260° C. Japanese Patent Publication No. 28619/1986 shows the characteristics of a two-component (PMN-PT) ceramic composition. This composition has a dielectric constant as high as 20000–21000 but the sintering temperature is also as high as 1100° C. and above and it has been difficult to manufacture a multilayer ceramic capacitor in which an inexpensive Ag/Pd based metal with a large proportion of the Ag component is used as an internal electrode material. Thus, none of the compositions have yet found commercial use on account of limitations from the viewpoint of costs.

The electrical characteristics that are to be possessed by ceramic compositions are high dielectric constant, small dielectric loss and high insulation resistance. However, $BaTiO_3$ based materials which have so far been used extensively have the problem that if one attempts to increase their dielectric constant, the temperature-dependent change in dielectric constant will increase and that if one attempts to reduce the size of grains in the sinter, the sintering temperature will increase. Thus, it has been difficult to satisfy the various necessary characteristics for the above-mentioned multilayer ceramic capacitor at sintering temperatures of 1100° C. and below where Ag-rich Ag/Pd alloys can be used as internal electrodes.

It is necessary that ceramic materials that have high dielectric constant, low dielectric loss and high insulation resistance and that are characterized by small grains in the sinter and a small number of pores should be developed as dielectric compositions for use in multilayer ceramic capacitors. Such characteristic requirements must be satisfied by ceramics that are sintered at temperatures not higher than 1100° C. and only when this condition is met, the recent need for producing multilayer ceramic capacitors of a smaller size with a larger capacity can be satisfied.

The present invention has as an object providing a dielectric ceramic composition that insures the above-mentioned characteristics to be exhibited in a desired manner even if it is sintered at temperatures not higher than 1100° C.

DISCLOSURE OF INVENTION

The present invention provides a dielectric ceramic composition that comprises as a main component a PMN-PNN-PT three-component ceramic composition which, when expressed by xPMN-yPNN-zPT, is defined by the area surrounded by the following points of (x, y, z), i.e., (0.70, 0.20, 0.10), (0.70, 0.15, 0.15), (0.83, 0.02, 0.15), (0.96, 0.02, 0.02) and (0.78, 0.20, 0.02), said ceramic composition further containing a Mn oxide or a Mn-containing complex oxide as additives.

In the PNN component of the ceramic composition as the main component increases, the temperature at the Curie point of the ceramic composition will make a large shift towards lower temperatures to cause a significant drop in the dielectric constant at room temperature. Conversely, if the PT component increases, the temperature at the Curie point will make a shift towards higher temperatures, leading to a greater dielectric loss and a lower dielectric constant at room temperature. If the PMN component decreases greatly, the temperature-dependent change in dielectric constant will increase, which is undesirable for practical applications.

The Mn oxide contained as additives is present in an amount of 0.001–2.0 mol %, preferably 0.003–1.0 mol %, as compared to the main component PMN-PNN-PT. If the content of the Mn oxide is less than 0.001 mol %, it is ineffective in improving the specific resistance at room temperature and elevated temperatures; if the content of the Mn oxide exceeds 2.0 mol %, the dielectric constant at room temperature will decrease to an undesirably low level.

Examples of the Mn-containing complex oxide as additives include $Pb(Mn_{\frac{1}{2}}Nb_{\frac{1}{2}})O_3$, $Pb(Mn_{\frac{1}{3}}Nb_{\frac{2}{3}})O_3$, $Pb(Mn_{\frac{1}{2}}Ta_{\frac{1}{2}})O_3$, $Pb(Mn_{\frac{1}{2}}W_{\frac{1}{2}})O_3$, $Pb(Mn_{\frac{1}{3}}Sb_{\frac{2}{3}})O_3$, etc. and these complex oxides achieve the same results as when the Mn oxide is contained. The contents of these Mn-containing complex oxides will vary somewhat depending upon the type of complex oxide used but preferably they are contained in amounts of 0.003–5.0 mol % as compared to the main component. If their addition is less than 0.003 mol %, they are ineffective in improving the specific resistance at room temperature and elevated temperatures; if they are added in an amount exceeding 5.0 mol %, the dielectric constant at room temperature will decrease to an undesirably low level.

Starting compounds that can be used in producing the ceramic composition of the present invention may be not only ordinary oxides of the necessary elements but also any compounds that are convertible to oxides upon calcination in an oxygen-containing atmosphere, and compounds that can be used include carboxylates such as oxalates and acetates, inorganic acid salts such as carbonates, nitrates and sulfates, as well as hydroxides.

Methods of mixing and calcination include not only a method in which all components including additives are mixed at a time and are subjected to calcination but also a method in which only part of the components are first mixed and subjected to calcination and, thereafter, the remaining components are added, followed by re-mixing and calcination. An optimal method is desirably selected in accordance with the type and composition of the starting compounds, as well as the type and amount of the Mn compounds to be added.

Calcination is performed in an oxygen-containing atmosphere, typically in air atmosphere, and the resulting calcined powder is ground by either a wet or a dry method to prepare a starting powder. This starting powder is shaped in the presence or absence of a binder and subsequently sintered to obtain a desired dielectric ceramic composition.

BEST MODE FOR CARRYING OUT THE INVENTION

The following examples are provided for the purpose of further illustrating the present invention. In the examples, the amount of each of the materials used is expressed in terms of pure content.

EXAMPLE 1

The starting materials used were PbO, MgO, $Nb_2O_5$, NiO, $TiO_2$ and $MnC_2O_4$ each having a purity of at least 99.5%. They were precisely weighed to provide the formulation shown in Table 1. The thus weighed starting materials were wet-mixed in a ball mill and thereafter wet-milled again in the ball mill. The slurry of the resulting powder was filtered, dried and transferred to a magnesia crucible where it was calcined at 800°–850° C. in air atmosphere. The calcined powder was wet-milled, filtered, dried and thereafter milled to prepare a starting powder. The starting powder was shaped into a disk of 10 mm$^\phi$ and 3 mm$^t$ with a hydrostatic press at a pressure of 2 t/cm$^2$. The disk was sintered in a magnesia crucible with a lid at 1000°–1100° C. for 1 hr. A silver electrode was baked to both top and bottom of the sintered specimen at 600° C. and the static capacity and dielectric loss at 20° C. were measured with an LCR meter at a frequency of 1 kHz and at a voltage of 1 Vrms so as to calculate the dielectric constant. The temperature-dependent change in dielectric constant was determined on the basis of static capacity measurements at −30° C. and +85° C. Subsequently, a dc voltage of 50 V was applied for 1 min and the current was measured with a microammeter to calculate the specific resistance. Specific resistance measurements were conducted at temperatures of 20° C. and 85° C. The results of measurements are shown in Table 1.

EXAMPLE 2

As in Example 1, PbO, MgO, $Nb_2O_5$, NiO, $TiO_2$ and $MnC_2O_4$ were used to provide the Mn content shown under No. 2 in Table 1, whereby a starting powder was synthesized. After shaping and sintering, the electrical characteristics of the sintered specimen were measured. The results are shown in Table 1.

EXAMPLES 3 and 4

The procedure of Example 2 was repeated except that $MnC_2O_4$ was replaced by $Mn(NO_3)_2$ to synthesize starting powders that would provide the compositions shown in Table 1. After shaping and sintering, the electrical characteristics of the sinters were measured. The results are shown in Table 1.

TABLE 1

| No. | Formulation of main component xPMN-yPNN-zPT | | | Auxiliary component type | Amount (mol % of the main component) | Electrical characteristics at room temperature (20° C.) (1 kHz, 1 Vrms, 50 VDC - 1 min) | | | Dielectric constant vs temperature characteristics (by reference to 20° C.) | | Specific resistance at high temperature (85° C.) (Ω cm) |
|---|---|---|---|---|---|---|---|---|---|---|---|
| | X | Y | Z | | | dielectric constant | dielectric loss | specific resistance Ω cm | −30° C. | +85° C. | |
| Example | | | | | | | | | | | |
| 1 | 70 | 20 | 10 | Mn oxide | 0.005 | 18700 | 1.3% | $2.1 \times 10^{12}$ | −51% | −64% | $0.9 \times 10^{12}$ |
| 2 | 70 | 15 | 15 | " | 0.03 | 17900 | 1.8 | $5.2 \times 10^{12}$ | −62 | −43 | $2.1 \times 10^{12}$ |
| 3 | 75 | 15 | 10 | " | 0.05 | 18300 | 1.3 | $4.3 \times 10^{12}$ | −56 | −52 | $2.1 \times 10^{12}$ |
| 4 | 78 | 20 | 2 | " | 0.5 | 16200 | 1.1 | $1.9 \times 10^{12}$ | −16 | −48 | $1.1 \times 10^{12}$ |
| 5 | 80 | 10 | 10 | (*1) | 0.03 | 18900 | 1.3 | $4.9 \times 10^{12}$ | −66 | −63 | $3.2 \times 10^{12}$ |
| 6 | 83 | 2 | 15 | " | 1.0 | 14900 | 0.8 | $1.5 \times 10^{12}$ | −48 | −36 | $1.1 \times 10^{12}$ |
| 7 | 85 | 10 | 5 | " | 2.0 | 13100 | 0.7 | $1.8 \times 10^{12}$ | −44 | −29 | $1.0 \times 10^{12}$ |
| 8 | 85 | 5 | 10 | (*2) | 0.01 | 15900 | 2.0 | $1.3 \times 10^{12}$ | −66 | −43 | $0.9 \times 10^{12}$ |
| 9 | 90 | 5 | 5 | " | 0.05 | 18300 | 0.9 | $3.7 \times 10^{12}$ | −42 | −69 | $1.2 \times 10^{12}$ |
| 10 | 96 | 2 | 2 | " | 0.1 | 16600 | 0.8 | $5.4 \times 10^{12}$ | −29 | −66 | $1.7 \times 10^{12}$ |
| Comparative Example | | | | | | | | | | | |
| 1 | 70 | 10 | 20 | Mn oxide | 0.003 | 13700 | 5.1 | $2.3 \times 10^{12}$ | −69 | −29 | $1.1 \times 10^{12}$ |
| 2 | 75 | 5 | 20 | " | 0.03 | 15900 | 7.6 | $5.1 \times 10^{12}$ | −72 | −23 | $2.7 \times 10^{12}$ |
| 3 | 70 | 25 | 5 | " | 0.01 | 10800 | 0.6 | $4.2 \times 10^{12}$ | −73 | −31 | $2.1 \times 10^{12}$ |
| 4 | 65 | 30 | 5 | " | 0.3 | 10600 | 0.4 | $5.3 \times 10^{12}$ | −79 | −61 | $3.1 \times 10^{12}$ |
| 5 | 75 | 25 | 0 | " | 0.01 | 7700 | 0.3 | $6.3 \times 10^{12}$ | −63 | −53 | $2.4 \times 10^{12}$ |
| 6 | 80 | 15 | 5 | — | — | 16400 | 1.2 | $2.4 \times 10^{12}$ | −21 | −63 | $0.2 \times 10^{12}$ |
| 7 | 90 | 5 | 5 | — | — | 17900 | 1.1 | $2.7 \times 10^{12}$ | −45 | −75 | $0.3 \times 10^{12}$ |

Note:
(*1) denotes $Pb(Mn_1Nb_1)O_3$ and
(*2) denotes $Pb(Mn_1W_1)O_3$.

EXAMPLES 5-7

Using PbO, MgO, Nb$_2$O$_5$, NiO, TiO$_2$ and MnCO$_3$ each having a purity of at least 99.5%, formulating was conducted in such a way that the molar ratio of Pb(Mn$_{1/3}$Nb$_{2/3}$)O$_3$ to the main component PMN-PNN-PT would be as indicated under Nos. 5-7 in Table 1, whereby starting powders were synthesized as in Example 1. After shaping and sintering, the electrical characteristics of the sinters were measured. The results are shown in Table 1.

EXAMPLES 8-10

Using PbO, MgO, Nb$_2$O$_5$, NiO, TiO$_2$, WO$_3$ and MnCO$_3$ each having a purity of at least 99.5%, formulating was conducted in such a way that the molar ratio of Pb(Mn$_{1/2}$W$_{1/2}$)O$_3$ to the main component PMN-PNN-PT would be as indicated under Nos. 8-10 in Table 1, whereby starting materials were synthesized as in Example 1. After shaping and sintering, the electrical characteristics of the sinters were measured.

The results are shown in Table 1.

COMPARATIVE EXAMPLES 1-5

As in Example 1, PbO, MgO, Nb$_2$O$_5$, NiO, TiO$_2$ and MnCO$_3$ each having a purity of at least 99.5% were used and weighed precisely to provide the formulations shown in Table 1. Subsequently, the weighed starting materials were wet-mixed in a ball mill and thereafter wet-milled again in the ball mill to synthesize starting powders. After shaping and sintering, the electrical characteristics of the sintered specimens were measured. The results are shown in Table 1.

COMPARATIVE EXAMPLES 6 AND 7

To investigate the effectiveness of addition of Mn compounds, starting powders for ceramic compositions were prepared that has the same composition of main component as in Examples 4 and 9 except that they did not contain Mn. As in Example 1, shaping and sintering were conducted and, thereafter, the electrical characteristics of the sintered specimens were measured. The results are shown in Table 1.

INDUSTRIAL APPLICABILITY

The ceramic composition having the compositional range specified by the present invention exhibits excellent characteristics for use as a material for multilayer ceramic capacitors. Further, by additionally containing a Mn compound or a Mn-containing complex oxide in accordance with the present invention, dielectric ceramics can be produced that are sinterable at low temperatures not higher than 1100° C. and that yet have superior electrical characteristics. As is clear from the table summarizing the results of the examples, the dielectric ceramics obtained by using the ceramic composition of the present invention have high dielectric constant at room temperature and their dielectric loss is also satisfactory ($\leq 2\%$). The temperature characteristic of dielectric constant also comply with the Y5V or Y5U specification under the EIA standard over the range of $-30°$ C. to $+85°$ C.

The Mn compound or Mn-containing complex oxide as an additive is effective in significantly improving the specific resistance both at room temperature and at 85° C. Dielectric ceramics that use the ceramic composition of the present invention are sinterable at 1100° C. and below, so Ag/Pd alloys of high Ag content can be used in place of Pd as materials for internal electrodes and this contributes to a substantial reduction in the manufacturing cost. Therefore, those ceramics are very useful as materials for multilayer ceramic capacitors and, hence, it may well be said that their industrial value is extremely high.

We claim:

1. A dielectric ceramic composition that comprises as a main component a three-component ceramic composition in solid solution of the ternary system having the formula Pb(Mg$_{1/3}$Nb$_{2/3}$)O$_3$-Pb(Ni$_{1/3}$Nb$_{2/3}$)O$_3$-PbTiO$_3$ which, when expressed by xPb(Mg$_{1/3}$Nb$_{2/3}$)O$_3$-yPb(Ni$_{1/3}$Nb$_{2/3}$)O$_3$-zPbTiO$_3$, wherein $x+y+z=1$, is defined by the area surrounded by the points defined by $x=0.70$, $y=0.20$, $z=0.10$; $x=0.70$, $y=0.15$, $z=0.15$; $x=0.83$, $y=0.02$, $z=0.15$; $x=0.96$, $y=0.02$, $z=0.02$ and $x=0.78$, $y=0.20$, $z=0.02$, said ceramic composition further containing, as an additive, a Mn-containing complex oxide of Pb(Mn$_{1/3}$Nb$_{2/3}$)O$_3$, Pb(Mn$_{1/3}$Ta$_{2/3}$)O$_3$, Pb(Mn$_{1/2}$W$_{1/2}$)O$_3$ or Pb(Mn$_{1/3}$Sb$_{2/3}$)O$_3$ in an amount of 0.003-5.0 mol % compared to said main component.

2. The composition of claim 1 wherein the additive is Pb(Mn$_{1/2}$W$_{1/2}$)O$_3$.

3. The composition of claim 1 wherein the additive is Pb(Mn$_{1/3}$Nb$_{2/3}$)O$_3$.

4. The composition of claim 1 wherein the additive is Pb(Mn$_{1/3}$Ta$_{2/3}$)O$_3$.

5. The composition of claim 1 wherein the additive is Pb(Mn$_{1/3}$Sb$_{2/3}$)O$_3$.

6. A dielectric ceramic composition that comprises as a main component a three-component ceramic composition in solid solution of the ternary system having the formula Pb(Mg$_{1/3}$Nb$_{2/3}$)O$_3$-Pb(Ni$_{1/3}$Nb$_{2/3}$)O$_3$-PbTiO$_3$ which, when expressed by xPb(Mg$_{1/3}$Nb$_{2/3}$)O$_3$-yPb(Ni$_{1/3}$Nb$_{2/3}$)O$_3$-zPbTiO$_3$, wherein $x+y+z=1$, is defined by the area surrounded by the points defined by $x=0.70$, $y=0.15$, $z=0.15$; $x=0.83$, $y=0.02$, $z=0.15$; $x=0.96$, $y=0.02$, $z=0.02$ and $x=0.78$, $y=0.20$, $z=0.02$, said ceramic composition further containing as an additive, a Mn oxide in an amount of 0.001-2.0 mol % compared to said main component or a Mn-containing complex oxide of Pb(Mn$_{1/3}$Nb$_{2/3}$)O$_3$, Pb(Mn$_{1/3}$Nb$_{2/3}$)O$_3$, Pb(Mn$_{1/3}$Ta$_{2/3}$)O$_3$, Pb(Mn$_{1/2}$W$_{1/2}$)O$_3$ or Pb(Mn$_{1/3}$Sb$_{2/3}$)O$_3$ in an amount of 0.003-5.0 mol % compared to said main component.

7. The composition of claim 6 wherein the Mn oxide additive is present in an amount of 0.003 to 1.0 mol %.

8. The composition of claim 6 wherein the additive is a Mn oxide.

9. The composition of claim 6 wherein the additive is a Mn-containing complex oxide of Pb(Mn$_{1/3}$Nb$_{2/3}$)O$_3$, Pb(Mn$_{1/3}$Nb$_{2/3}$)O$_3$, Pb(Mn$_{1/3}$Ta$_{2/3}$)O$_3$, Pb(Mn$_{1/2}$W$_{1/2}$)O$_3$ or Pb(Mn$_{1/3}$Sb$_{2/3}$)O$_3$.

10. The composition of claim 9 wherein the additive is Pb(Mn$_{1/2}$W$_{1/2}$)O$_3$, Pb(Mn$_{1/3}$Nb$_{2/3}$)O$_3$, Pb(Mn$_{1/3}$Ta$_{2/3}$)O$_3$ or Pb(Mn$_{1/3}$Sb$_{2/3}$)O$_3$.

* * * * *